T. R. WEYMOUTH.
ORIFICE PLATE FOR FLUID FLOW METERS.
APPLICATION FILED SEPT. 24, 1914.
1,206,185.
Patented Nov. 28, 1916.
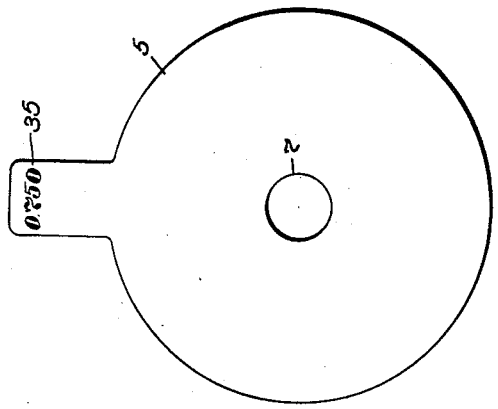
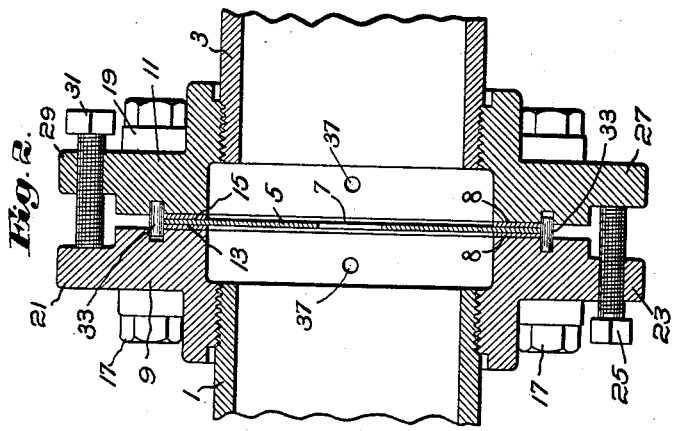
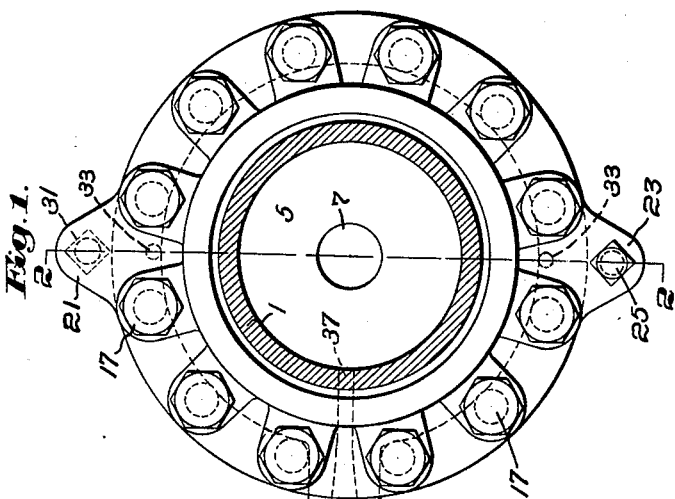
Witnesses:
Horace A. Crossman
Carl L. Choate
Inventor:
Thomas R. Weymouth
by Emery, Booth, Janney & Varney
Attys

UNITED STATES PATENT OFFICE.

THOMAS R. WEYMOUTH, OF OIL CITY, PENNSYLVANIA, ASSIGNOR TO THE FOXBORO COMPANY, OF FOXBORO, MASSACHUSETTS, A CORPORATION OF MASSACHUSETTS.

ORIFICE-PLATE FOR FLUID-FLOW METERS.

1,206,185.   Specification of Letters Patent.   Patented Nov. 28, 1916.

Application filed September 24, 1914. Serial No. 863,380.

*To all whom it may concern:*

Be it known that I, THOMAS R. WEYMOUTH, a citizen of the United States, and resident of Oil City, Pennsylvania, have invented an Improvement in Orifice-Plates for Fluid-Flow Meters, of which the following description, in connection with the accompanying drawings, is a specification, like characters on the drawings representing like parts.

This invention relates to meters for measuring the flow of fluids.

In measuring the flow of gas it is customary to interpose in a pipe a plate containing a standard orifice for restricting the flow and causing a greater pressure on one side of the orifice than on the other. A differential pressure gage may be connected to the pipe at the opposite sides of the orifice, thereby enabling the differential pressures to be ascertained and the flow measured. From time to time it is desired to introduce in the pipe plates containing different sized orifices. Heretofore the plate has been introduced into and removed from the pipe in an inconvenient and difficult manner. Also the plate has been so completely concealed by the devices for retaining it as to render it difficult to determine the size of its orifice. This invention among other objects aims to provide a construction whereby the orifice plate may be readily inserted or removed by a simple operation and a plate whereby the size of its orifice is readily ascertained.

The character of the invention may be best understood by reference to the following description of an illustrative embodiment thereof shown in the accompanying drawing, wherein:

Figure 1 is a side elevation of an illustrated orifice plate holding device shown herein as embodying the invention; Fig. 2 is a section taken on line 2—2 of Fig. 1; and Fig. 3 is a plan of an illustrative orifice plate embodying the invention.

Referring to the drawing, 1 and 3 designate end portions of pipes through which gas or other fluid is adapted to flow. Between the opposed ends of these pipes is placed a plate 5 having an orifice 7 therein. Gasket rings 8, 8 are provided at opposite sides of the plate to secure a tight joint. The plate has a diameter substantially larger than that of said pipes. To secure the plate in position and connect the pipes one is provided with a ring 9 threaded thereto and the other is provided with a ring 11 threaded thereto. The meeting faces of said rings are reduced to present annular seats 13 and 15 for gripping the orifice plate between them. To draw the rings together they are provided with a series of bolts 17 entered through registering holes in said rings. To strengthen the rings about the holes they may have thickened portions 19.

When the bolts are tensioned they will draw the rings toward one another and securely grip the orifice plate between them without possibility of leakage.

When it is desired to separate the rings to free the orifice plate and substitute another therefor it is difficult to push apart the pipes 1 and 3. To facilitate this the ring 9 is provided with a blank ear 21 and an ear 23 tapped to receive a set screw 25. The ring 11 is also provided with a blank ear 27 and an ear 29 tapped to receive a set screw 31. The set screw of each is opposed to and adapted to bear against the blank ear of the other.

When it is desired to remove an orifice plate, first the bolts 17 are loosened and then the set screws 25 and 31 are set up and in so doing their ends act against the blank ears and press the rings apart sufficiently to release the orifice plate and permit a ready removal thereof. The facing of the plate may be coated with plumbago to prevent its adhering to the gaskets on removal.

To facilitate the alining of the two rings one may have dowels 33 for insertion into corresponding seats in the other.

When the orifice plate is fast between its clamping rings its orifice is invisible. In order that the size of said orifice may readily be known the plate 5 is provided with a tab 35 of sufficient extent to extend beyond the clamping rings. On this tab is stamped or otherwise appropriately permanently marked the size of the orifice. Thus its size can be readily ascertained while the plate is in active position without the necessity of first removing the same from its clamping rings. This tab also serves as a handle which may be readily grasped when inserting and removing the plate.

The pipes (not shown) leading to the differential pressure gage may be connected to tapped holes 37, 37 entered into the rings 9 and 11 referred to.

By my invention there is provided a simple and effective device for securely holding the orifice plate and permitting its insertion into or removal from the pipes and also an orifice plate constructed readily to disclose the size thereof.

Having described one illustrative embodiment of the invention without limiting the same thereto, what I claim as new and desire to secure by Letters Patent is:

1. In a fluid flow meter, the combination of pipes 1 and 3 having opposed ends, an orifice plate 5, rings 9 and 11 threaded to said pipes, bolts 17 for drawing said rings into tight clamping engagement with said plate, ears 21, 23, 27 and 29 projecting from said rings, and set screws 25 and 31 coöperating therewith for spreading said rings to permit the removal of said plate.

2. In a fluid flow meter, the combination of pipes, an orifice plate, rings secured to said pipes, means for adjusting said rings to clamp said plate between them, and screw means for separating said rings to permit the removal of said plate.

3. In a fluid flow meter, the combination of pipes, an orifice plate interposed between them, members secured to said pipes, and means for drawing said members toward one another to secure said plate between them, one of said members having a blank ear and the other of said members having an ear tapped for receiving a screw whereby the screw may be turned to act on said blank ear and force the members apart and release the plate therefrom.

4. In a fluid flow meter, the combination of pipes, an orifice plate interposed between them, and rings secured to said pipes, each of said rings having a blank ear and an ear tapped for receiving a screw, a blank ear of one being opposed to a tapped ear of another whereby the screws may be turned to force the rings apart and release the plate therefrom.

5. In a fluid flow meter, the combination of an orifice plate, members for receiving said plate between them, means for drawing said members toward one another, and means for forcing said members apart to permit the removal of said plate.

6. In a fluid flow meter, the combination of pipes having opposed ends, an orifice plate, rings secured to said pipes, means for drawing said rings together tightly to clamp said plate in position between the ends of said pipes, ears projecting from said rings and screw means extending between the ears for forcing apart said rings to permit the removal of said plate.

7. In a fluid flow meter, the combination of an orifice plate, and rings for clamping said plate between them, said plate having a size index tab projecting beyond said rings to remain visible when the plate is clamped in active position.

8. In a fluid flow meter, the combination of an orifice plate, members for clamping said plate between them, and a size index tab integral with said plate and projecting beyond said members to leave said index visible when said plate is clamped in active position.

9. In a fluid flow meter, the combination of an orifice plate, members for clamping said plate between them, and a handle projecting from said plate for facilitating the insertion and removal thereof.

In testimony whereof, I have signed my name to this specification, in the presence of two subscribing witnesses.

THOS. R. WEYMOUTH.

Witnesses:
W. T. YOUNG,
C. W. GLEASON.